Sept. 23, 1969    F. S. PAYERLE    3,468,187
FOOT PEDAL CONNECTOR FOR PUSH-PULL CONTROL CABLE
Filed Aug. 25, 1967

INVENTOR.
FRANK S. PAYERLE
BY *Hamilton & Cook*
ATTORNEYS

United States Patent Office 3,468,187
Patented Sept. 23, 1969

3,468,187
FOOT PEDAL CONNECTOR FOR PUSH-PULL CONTROL CABLE
Frank S. Payerle, Akron, Ohio, assignor, by mesne assignments, to North American Rockwell Corporation, Pittsburgh, Pa., a corporation of Delaware
Filed Aug. 25, 1967, Ser. No. 663,303
Int. Cl. G05g 1/14; F16c 1/20
U.S. Cl. 74—512                                 4 Claims

ABSTRACT OF THE DISCLOSURE

A connector for operatively joining a pivotal foot pedal to the core of a push-pull control cable through a floor board. A fitting is secured to the casing of the push-pull cable and rigidly fixed through the floor board. A push rod is slidably received in the fitting with one end of the push rod being attached to the core of a push-pull cable, and the other end of the push rod is attached to a connector bar extending generally transversely thereof. The connector bar is swingingly mounted on a yoke affixed to the pedal. The swinging mount comprises a pair of links which extend between the connector bar and the yoke and are pivotally attached to both. Spring means bias the connector bar to its outermost position.

BACKGROUND OF THE INVENTION

Vehicular throttle control by means of a floor mounted accelerator pedal has been in use almost as long as automobiles themselves. Originally, mechanical linkage extended from the carburetor to the accelerator pedal, preferably by as direct a route as possible.

The advent of the push-pull control cable, a prime example of which can be found in U.S. Patent No. 3,320,665 to John F. Morse, provided an excellent means for conveniently connecting the carburetor to the foot pedal without the necessity of a direct route therebetween.

Heretofore, in such push-pull cable installations the casing of the pull-push cable was secured below the floor board of the vehicle. The end of the cable core was attached to one end of a rigid push rod, and the other end of the push rod was connected to the accelerator pedal. The push rod was telescopically received within a sleeve which was, in turn, supported at the end of the cable casing by a swivel connection to accommodate the arcuate movement imparted thereto as the accelerator pedal swung about its pivot.

Such an installation required the floor board to be slotted so as not to interfere with the swinging movement of the sleeve. The slot admitted hot air from the engine compartment during warm weather and cold air during cool weather. Flexible boots were employed in an attempt to minimize the admission of air, but these were, at best unsatisfactory under continued use.

SUMMARY OF THE INVENTION

It is therefore a primary object of the present invention to provide a pedal connection for a push-pull cable which can be fixedly positioned through the floor board on which the pedal is mounted so as to permit a permanent seal between it and the floor board.

This and other objects of the present invention will become apparent from the following specification and are accomplished by means hereinafter described and claimed.

In general, a connector embodying the concept of the present invention employs a fitting secured to the casing of a push-pull cable and anchorable through a floor board to which it can be sealed. A push rod is slidably received within the fitting with one end attached to the core and the other end secured to a connector bar. The connector bar is swingingly carried on a yoke fixed to a pivotal foot pedal by a pair of links pivotally attached between the yoke and the connector bar. Spring means bias the connector bar toward its outermost position.

One preferred embodiment of the present invention is shown by way of example in the accompanying drawings and hereinafter described in detail without attempting to show all of the various forms and modifications in which the invention might be embodied; the invention being measured by the appended claims and not the details of the specification.

DESCRIPTION OF THE PREFERRED EMBODIMENT

Figure 1:
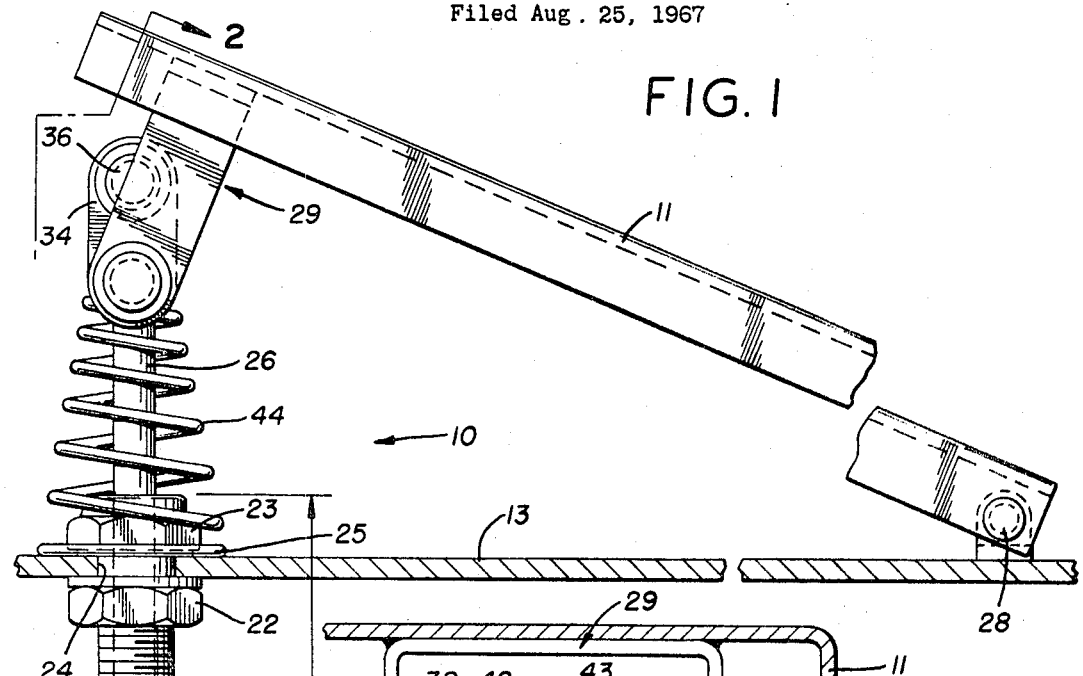
FIG. 1 is a side elevation of pedal operatively joined to a push-pull control cable by a connection embodying the concept of the present invention.
Figure 2:
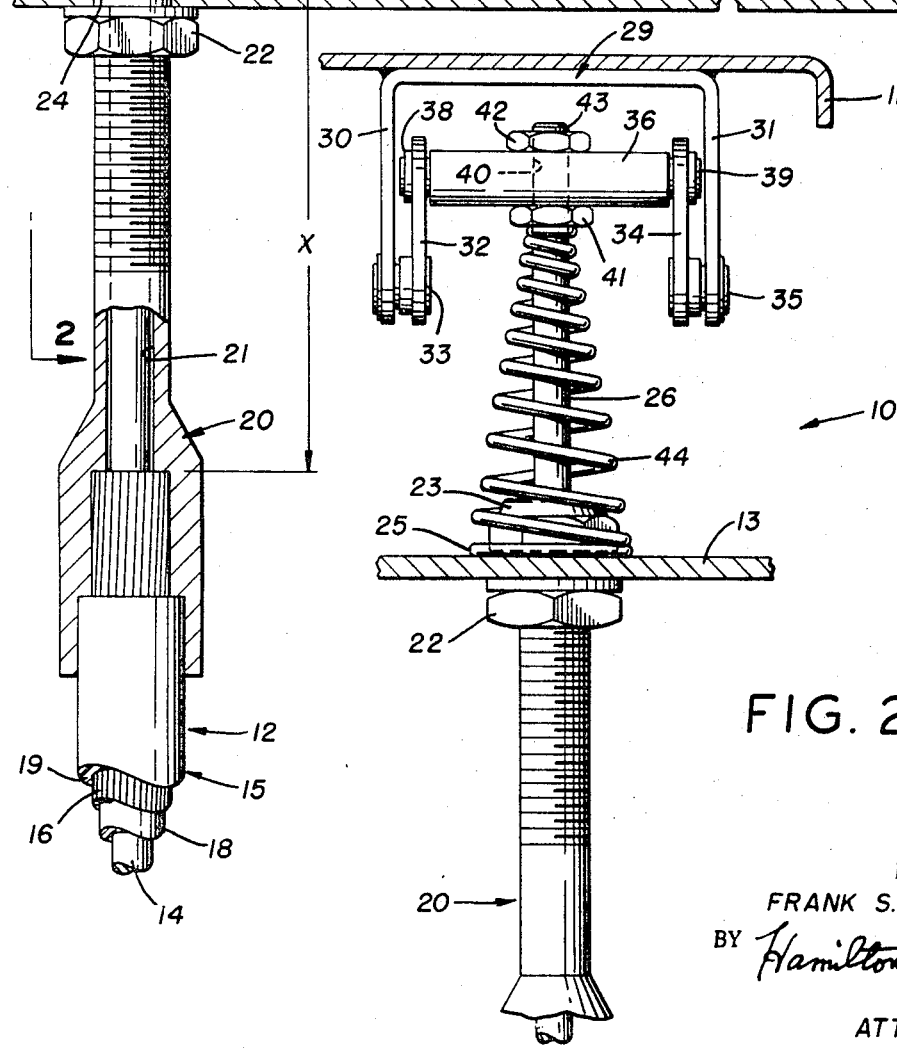
FIG. 2 is an end elevation, partly broken away and partly in section, taken substantially on line 2—2 of FIG. 1.

Referring more particularly to the drawings, the improved connection, indicated generally by the numeral 10, is depicted operatively joining a foot pedal 11 to a push-pull control cable 12 through the floor board 13 on which the pedal 11 is mounted. As will become apparent, the pedal 11 could as well be mounted from a member outwardly of the floor board without altering the concept of the connection 10.

The push-pull cable 12 comprises not only the working member, or core, 14 but also the casing 15 in which the core 14 is reciprocatingly slidable. The prior art knows many casing constructions, only one of which is depicted environmentally in the drawings. The casing 15 comprises a purality of wires 16 continuously laid in the form of a helical coil about the radially outer surface of an inner, flexible hollow tube 18 which extends the full length of the casing 15. An outer, flexible cover 19 encases the coil or wires 16 and extends along the entire casing to generally within a short distance from the ends of the wires.

A fitting 20 is positioned over the ends of the wires 16 and cover 19 and securely attached thereto, as by swaging. The interior, axial passage 21 through fitting 20 is aligned with the hollow tube 18 and has an axial extent $x$ at least equal to, and preferably greater than, the displacement which will be required of the core 14 by the pedal 11.

A portion of the outer surface of fitting 20 is provided with threads on which a pair of oposed nuts 22 and 23 may be received. The threaded portion of the fitting 20 may be tightly fitted through an opening 24 in the floor board 13 and the nuts 22 and 23 tightened against the opposite sides thereof to lock the casing 15 to the floor board 13. Additional sealing means, such as the washer 25, may also be positioned around the fitting 20 by the nuts 22 and 23 to prevent the passage of air or noxious fumes through opening 24.

A push rod 26 is reciprocatingly slidable in the passage 21 through fitting 20, and one end thereof is affixed to the core 14. The other end of the push rod 26 is uniquely attached to the pedal 11 by the following arrangement.

The pedal 11, which is pivotally mounted on the floor board 13 as by pin 28, carries a yoke 29 having opposed, parallel legs 30 and 31 which extend substantially perpendicularly outwardly of the pedal 11. One end of a swing link 32 is povotally attached to the leg 30 by a pin 33, and a like swing link 34 is similarly attached to the leg 31 by a pin 35.

A connector bar 36 extends between, and is pivotally attached to, the other ends of the swing links 32 and 34, as at 38 and 39. The push rod 26 extends through a transverse bore 40 in the connector bar and is lockingly received therein, as by a pair of nuts 41 and 42 which embrace the connector bar 36 and which can be tightened thereagainst on the threads 43 along the end of the push rod 26.

The provision of a pyramidally coiled compression spring 44 encircling the push rod 26 and extending between the floor board 13 and the connector bar 36 continuously biases the pedal 11 toward its outermost position. As such, the application of foot pressure on the pedal 11 overcoming the spring 44 will move the core 14 in one direction, and the spring 44 will reciprocate the core in the opposite direction upon release of foot pressure. This arrangement is ideal for accelerator applications.

A connection constructed according to the concept of the present invention is therefore capable of being tightly sealed through the floor board and yet the arcuate movement of the pedal 11 with respect to the required axial translation of the push rod 26 is readily accommodated.

What is claimed is:

1. A connector for operatively joining a pivotal foot pedal to the core of a push-pull control cable through a floor board, the push-pull cable having a casing with a core slidably received therein and a fitting secured to the casing, a push rod slidably received in the fitting, the push rod having first and second ends, the first end attached to the core of the push-pull cable, said connector comprising, attaching means fixedly securing said fitting to the floor board, a connector bar, said connector bar secured to the second end of said push rod and extending generally transversely thereof, a yoke means secured to said pedal, and swing means pivotally connected between said connector bar and yoke means.

2. A connector, as set forth in claim 1, in which the fitting has an axial passage therethrough having an axial extent greater than the axial displacement required of said core by movement of said pedal.

3. A connector, as set forth in claim 2, in which the swing means comprise a pair of links, one end of each link being pivotally secured to the connector bar and the other end of each link being pivotally secured to the yoke means.

4. A connector, as set forth in caim 3, in which the yoke means comprise a pair of opposed, parallel legs extending outwardly of the pedal, each said leg being pivotally attached to one of said links.

References Cited

UNITED STATES PATENTS

| 2,787,917 | 4/1957 | Schroeder | 74—502 |
| 2,825,418 | 3/1958 | Kershman | 74—513 X |
| 2,985,031 | 5/1961 | Bennett | 74—512 |
| 3,089,454 | 5/1963 | Chronic. | |

FOREIGN PATENTS

| 642,853 | 9/1950 | Great Britain. |
| 792,985 | 4/1958 | Great Britain. |

FRED C. MATTERN, Jr., Primary Examiner

C. F. GREEN, Assistant Examiner

U.S. Cl. X.R.

74—105, 502, 560